UNITED STATES PATENT OFFICE.

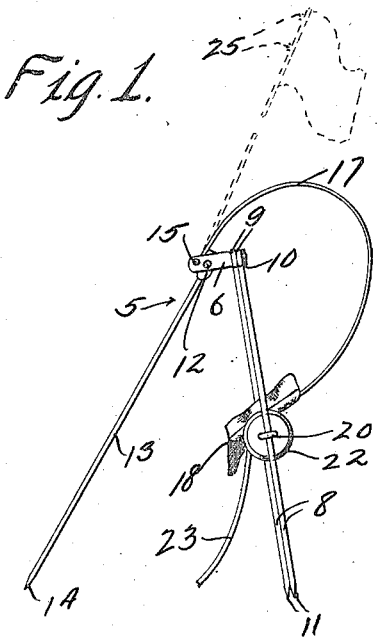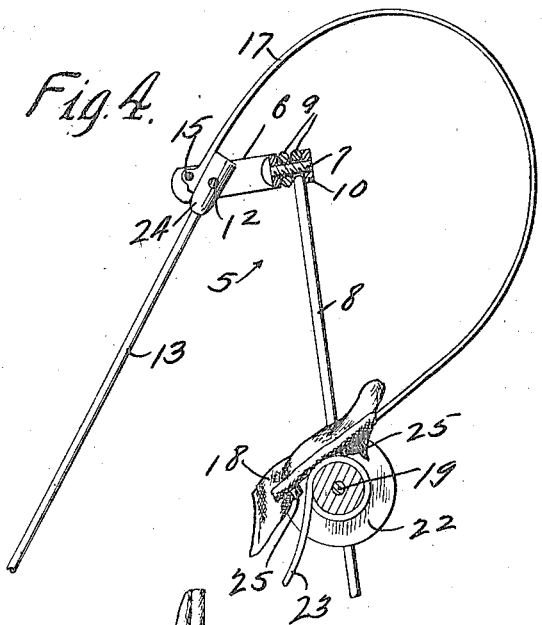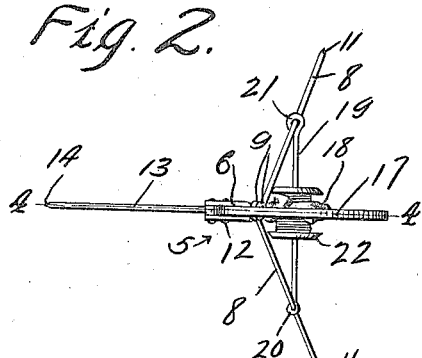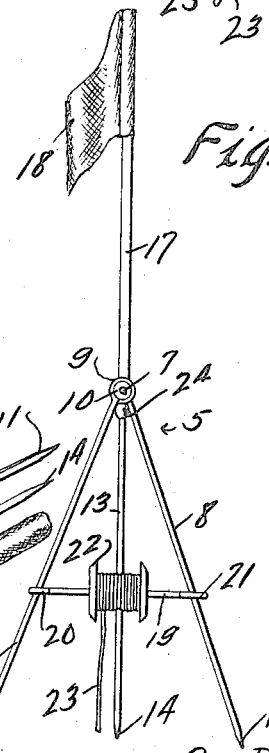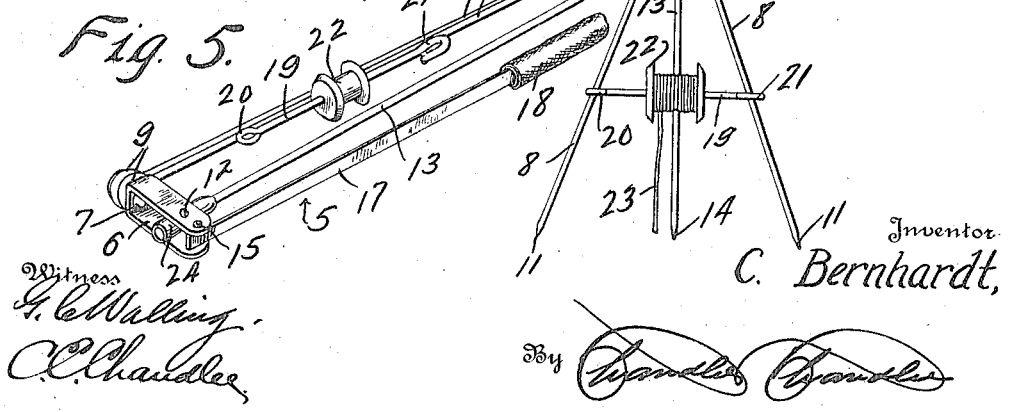

CHARLES BERNHARDT, OF FITCHBURG, MASSACHUSETTS.

SIGNAL DEVICE FOR FISHING-LINES.

1,264,000. Specification of Letters Patent. Patented Apr. 23, 1918.

Application filed September 15, 1917. Serial No. 191,560.

*To all whom it may concern:*

Be it known that I, CHARLES BERNHARDT, a citizen of the United States, residing at Fitchburg, in the county of Worcester, State of Massachusetts, have invented certain new and useful Improvements in Signal Devices for Fishing-Lines; and I do hereby declare the following to be a full, clear, and exact description of the invention, such as will enable others skilled in the art to which it appertains to make and use the same.

This invention relates to improvements in signal devices for fish lines and is directed more particularly to an article designed primarily for use in those localities where ice fishing is in vogue.

In fishing of this character it is the usual custom to cut in the ice a hole of suitable dimensions and to drop the baited line therethrough.

The purpose of the present invention is to provide an article of novel construction which is connected with the line and when the bait has been seized will automatically display a signal so that the necessary steps may be taken to creel the fish.

A further object of the invention is to provide a device which when not in use may be folded in novel manner into relatively compact form to facilitate its storage.

With the above and other objects of similar nature in view, the invention consists in the construction, combination and arrangement of parts, set forth in and falling within the scope of the appended claim.

In the drawings:—

Figure 1 is a side elevation of the device in readiness for use,

Fig. 2 is a top plan view thereof,

Fig. 3 is a rear view,

Fig. 4 is a section taken on the line 4—4 of Fig. 2, and

Fig. 5 is a perspective view of the device folded for storage.

Referring now more particularly to the accompanying drawing, there is shown a signal device such as contemplated by the invention consisting of a frame that is of substantially tripod formation and is designated generally at 5. Specifically the frame 5 consists of a substantially U-shaped yoke 6 that is located at the apex of the frame and has fixed in its bight or connecting portion a pivot pin 7.

Similarly formed supporting legs 8 are provided and terminate at their upper ends in eyes 9 which pivotally receive the pin 7 and are held in position thereon by means of a nut 10. The legs 8 are furthermore formed with sharpened lower extremities 11 that are adapted to penetrate the ice and thus rigidly support the frame when in use.

Extending transversely between the arms of yoke 6 midway their ends is a pin 12 with which is pivotally engaged a third supporting leg 13, the lower extremity of which is also sharpened as indicated at 14. A second transverse pin 15 extends between the legs of the yoke 6 outwardly of the pin 12 and has pivotally engaged therewith one end of a signal arm 17, said arm consisting of a strip of spring steel and carrying at its free end a flag 18.

A rod 19 having at one end an eye 20 and at its opposite end a spring hook 21 extends between and is slidably connected with the legs 8 of the frame for adjustment longitudinally thereof, one of the legs being passed through the eye 20 while the hook 21 is detachably engaged with the other of said legs. Rotatably supported upon the rod 19 is a reel or spool 22 on which is wound a line 23 that is adapted to be equipped with a hook and sinkers in the usual manner.

The device is illustrated in Fig. 1 as set up for use and when so disposed is adapted to be positioned over an opening cut in the ice with the sharpened extremities of the legs penetrating the latter. It will be noted that the upper end of the leg 13 is enlarged as indicated at 24 and when positioned for use serves to clamp the signal arm 17 between it and the pin 15 whereby to hold the arm against pivotal movement. This is illustrated most clearly in Fig. 3. With the line properly baited it is dropped through an opening in the ice, while the signal arm 17 is bowed or bent to engage the reel 22 it being provided at its free end with spaced projections 25 which straddle the reel and hold the arm against disengagement therefrom. When a fish seizes the baited line and unwinds it from the latter, said reel will release the arm 17 whereupon it will spring to an upright position and thus indicate that a fish is on the line so that its capture may be effected.

At such times as the device is not in use, it may be folded into relatively small compass as shown in Fig. 5 to facilitate its storage. This collapsing of the structure is accomplished by disengaging the rod 19 from the legs 8 and folding the latter on the pivot pin 7. The leg 13 is then swung to disengage the arm 17 and the latter folded thereupon as is clearly illustrated.

What I claim is:—

A signal device for fishing lines, comprising a tripod including a head and legs pivoted thereto, a rod having an eye at one end slidably engaged with one of the legs and having a hook at its opposite end for clamping engagement with another leg of the frame, a reel rotatably mounted upon the rod and a resilient signal arm pivoted to the head in position for clamping engagement with the remaining leg of the tripod when in supporting position, said arm being bendable into engagement of its otherwise free end with the reel movable from such engagement when the reel is rotated.

In testimony whereof, I affix my signature in the presence of two witnesses.

CHAS. BERNHARDT.

Witnesses:
HERMAN E. BEAN,
ALFRED C. WENZEL.

Copies of this patent may be obtained for five cents each, by addressing the "Commissioner of Patents, Washington, D. C."